Figure 1:
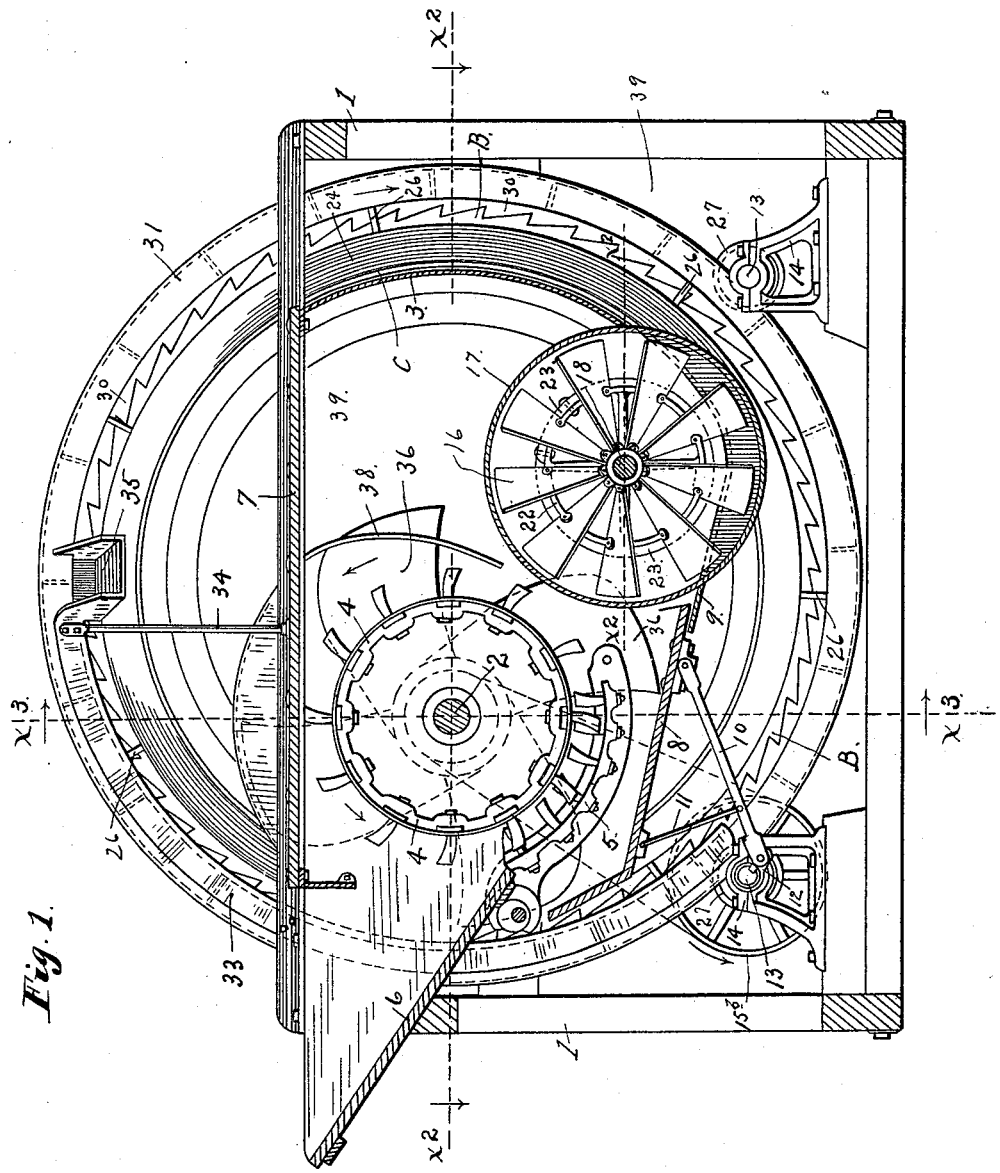

(No Model.)  5 Sheets—Sheet 1.
F. E. McNALL.
COMBINED THRESHER AND SEPARATOR.

No. 588,803. Patented Aug. 24, 1897.

Witnesses.
C. F. Kilgore
R. D. Merchant

Inventor.
Frank E. McNall.
By his Attorney,
Jas. F. Williamson

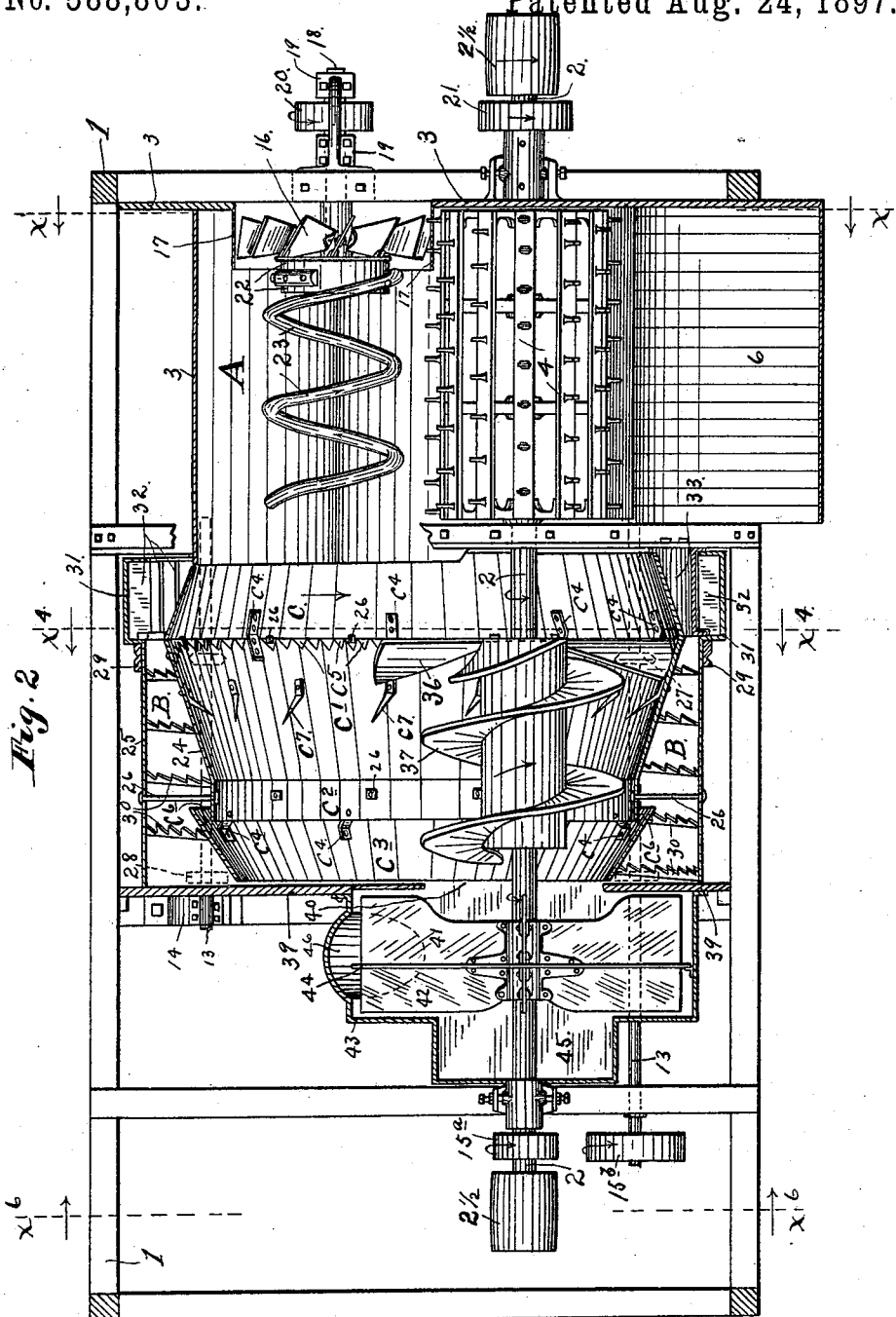

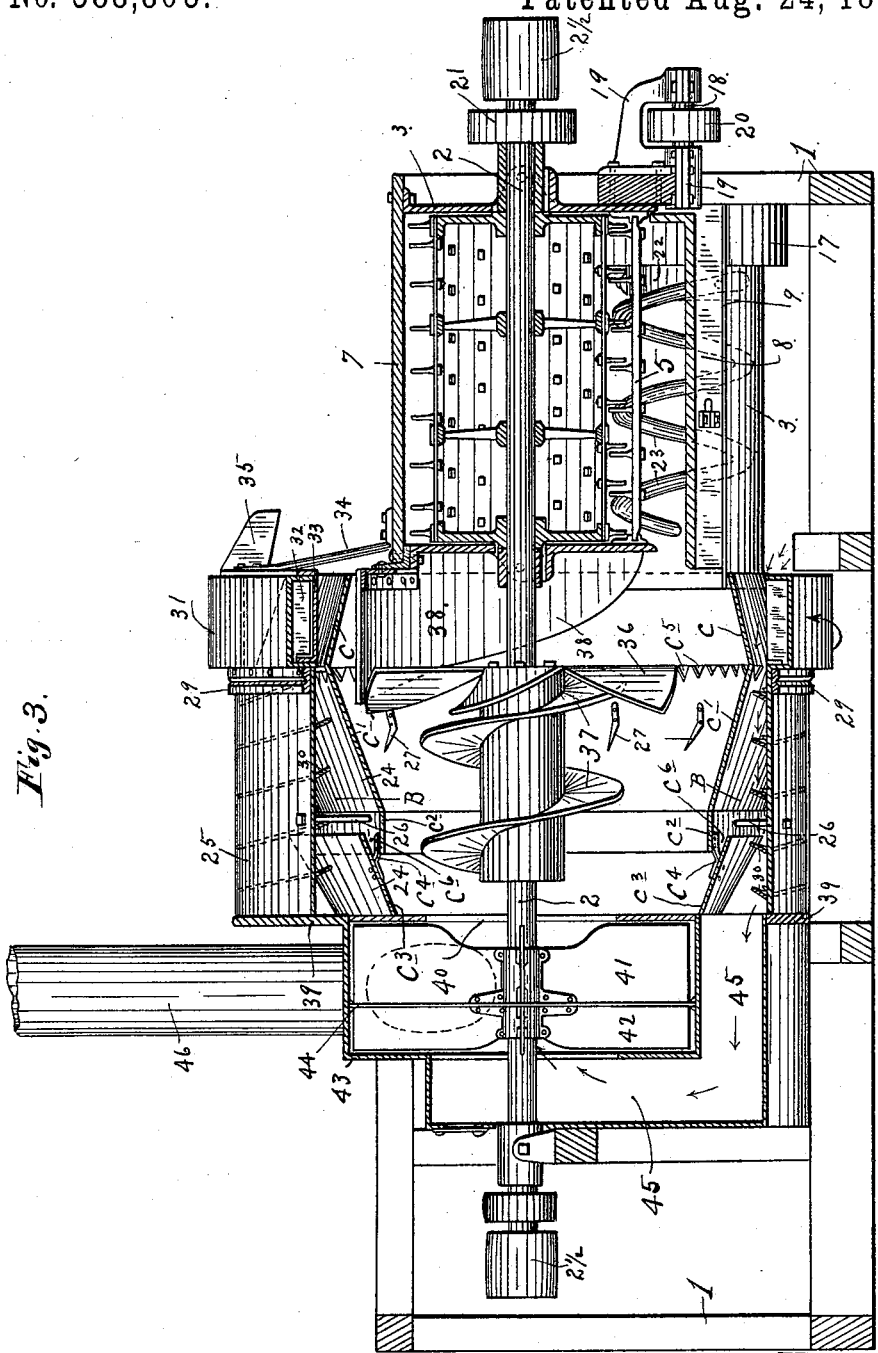

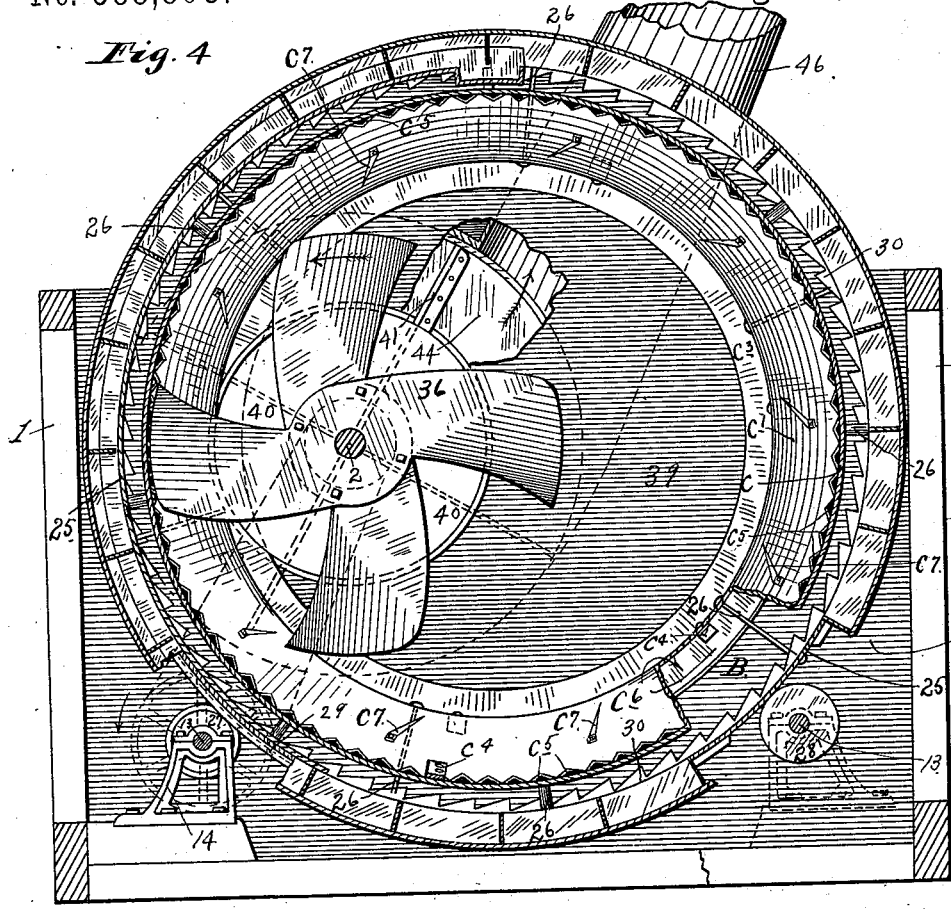
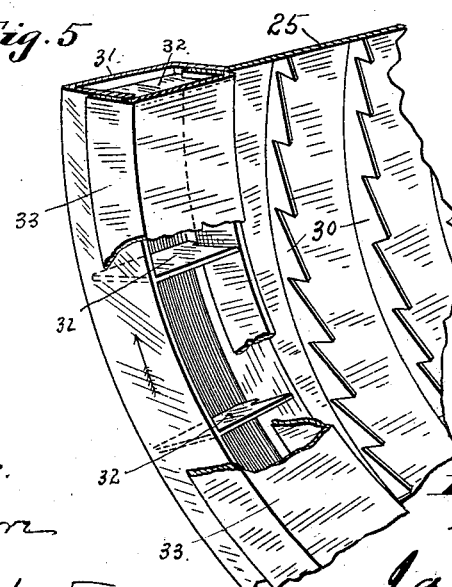

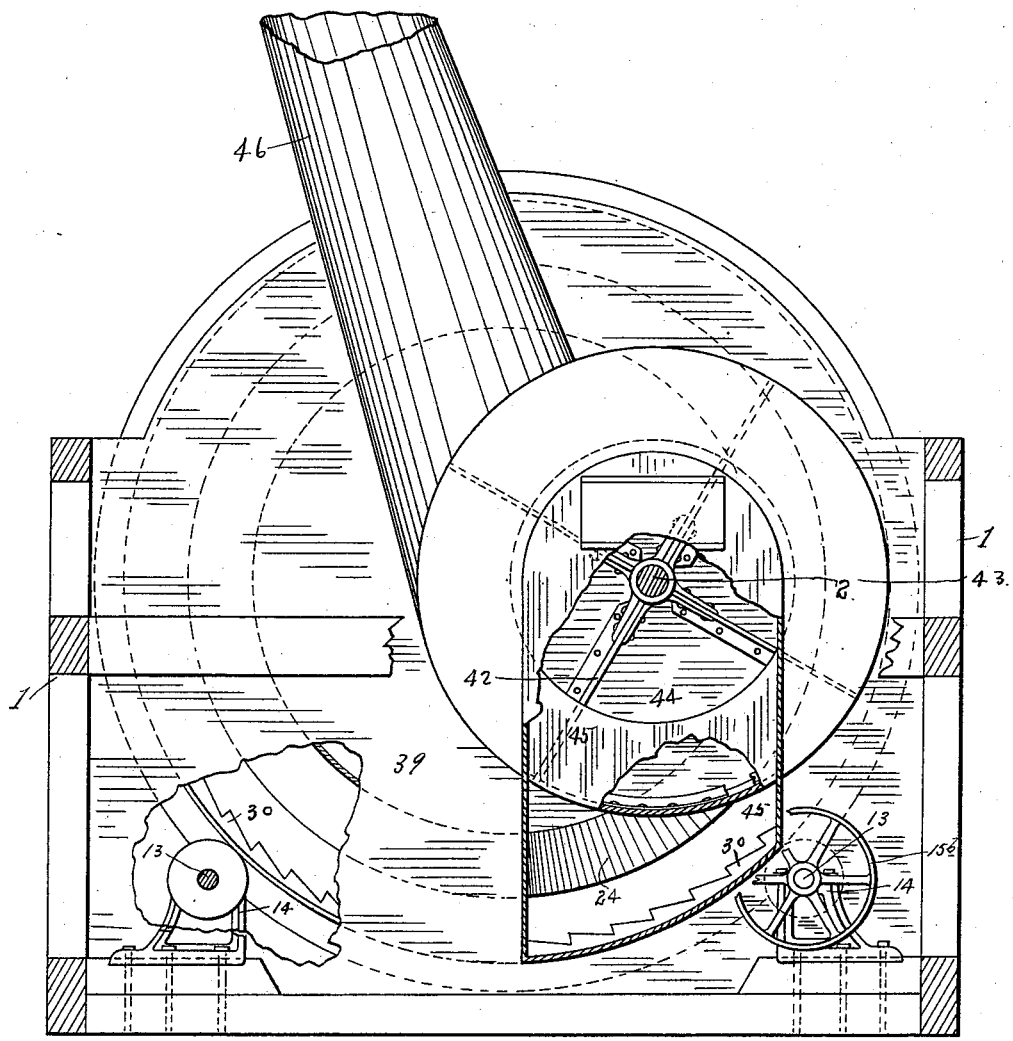

UNITED STATES PATENT OFFICE.

FRANK E. McNALL, OF MINNEAPOLIS, MINNESOTA.

COMBINED THRESHER AND SEPARATOR.

SPECIFICATION forming part of Letters Patent No. 588,803, dated August 24, 1897.

Application filed August 5, 1896. Serial No. 601,775. (No model.)

*To all whom it may concern:*

Be it known that I, FRANK E. McNALL, a citizen of the United States, residing at Minneapolis, in the county of Hennepin and State of Minnesota, have invented certain new and useful Improvements in a Combined Thresher and Separator; and I do hereby declare the following to be a full, clear, and exact description of the invention, such as will enable others skilled in the art to which it appertains to make and use the same.

My invention relates to combined threshers and separators, and has for its object to improve the same with a view of increased efficiency in the separating action.

The design of my machine is such as to render centrifugal force and air-pressure simultaneously available on the stock in the separating action.

To the ends above noted my invention consists of the novel devices and combinations of devices hereinafter described, and defined in the claims.

The invention is illustrated in the accompanying drawings, wherein, like notations referring to like parts throughout the several views—

Figure 1 is a vertical section on the line $x'\, x'$ of Fig. 2. Fig. 2 is a view, chiefly in horizontal section, but partly in plan, on the line $x^2\, x^2$ of Fig. 1. Fig. 3 is a vertical section on the line $x^3\, x^3$ of Fig. 1. Fig. 4 is a vertical section on the line $x^4\, x^4$ of Fig. 2. Fig. 5 is a detail, chiefly in perspective, but partly in section, with some portions broken away for showing the relation of the separator-trunk to the fixed part of the elevator; and Fig. 6 is a view, partly in vertical section and partly in end elevation, on the line $x^6\, x^6$ of Fig. 2, with some portions broken away.

In a skeleton frame 1 of any suitable construction I mount a horizontal shaft 2 in suitable bearings secured to the frame. This shaft 2 runs lengthwise of the machine, and to the same are secured various parts which will presently be noted. At its opposite ends the said shaft 2 is provided with driving-pulleys 2½ for interchangeable use in the application of the belt from the engine or other source of power. The said horizontal shaft 2 is located at one side of the center of the main frame. To the head end of the said shaft, within a suitable casing 3, is fixed the threshing-cylinder 4, and directly under the said cylinder is located a coöperating concave 5, which is adjustably mounted in respect to the cylinder in the ordinary or any suitable way. A suitable feed-hopper 6 projects to the left side of the machine for supplying the unthreshed stock to the cylinder and concave. The casing 3 extends beyond the threshing-cylinder and concave and is of substantially curvilinear form up to the point of junction with the top board or deck 7.

The parts 3 and 7 of the casing beyond the cylinder and concave toward the right constitute a chamber A for receiving the threshed stock as it comes from the cylinder and concave or thresher proper. Directly under the concave is located a gather-board 8, with its delivery end overlying an upturned or angular projection 9 from the floor of the casing 3 in the receiving-chamber A. This gather-board 8 is additionally supported by the pitman 10 and brace-rod 11, connected thereto. The pitman 10 unites, at its outer and lower end, to a crank-arm 12 on the left-hand or driving member of a pair of friction-roller shafts 13, mounted in suitable bearings 14, fixed in the main frame 1. The left-hand shaft 13 receives motion from the main shaft 2 through pulleys $15^a$ and $15^b$, located one on each of said shafts, and a suitable belt. (Not shown.) In virtue of the connections 10 and 12 the gather-board 8 will receive a crank motion from the shaft 13 with the effect of delivering the grain received from the cylinder and concave into the receiver A, formed by the extended part of the casing 3, as above noted.

At the head of the receiving-chamber A is located a blast-fan 16 and fan-house 17, with the fan carried on a stub-shaft 18, mounted in suitable bearings 19, fixed to the main frame 1. The fan-house 17 constitutes a part of or is supported in any suitable way within the casing 3 and is open at its ends for delivering air from the outside of the casing to the head of the chamber A. The fan-shaft 18 receives motion from the main shaft 2 through suitable pulleys 20 and 21 and a suitable belt. (Not shown.) To the inner edges of the blades of the fan 16 is fixed a rim or ring 22, which has attached thereto in any suitable way the forward end of a worm conveyer 23. Under the coöperation of the fan 16 and the worm conveyer 23 the threshed stock is forced through the receiving-chamber A and into the head or receiving end of a rotary separating-drum. This separating-drum is made up of a pair of concentric shells 24 and 25, tied together and spaced apart from each other by stay-bolts 26 or other suitable means. Said drum encircles the main shaft 2 and is mounted for rotary movement on friction-wheels 27 and 28, fixed to the shafts 13, hitherto noted. The forward members 27 of said friction-wheels are wedge-shaped in cross-section and engage with a wedge-grooved band 29, fixed to the head end portion of the outside shell 25. The rear pair 28 of said friction-wheels are flat-faced and engage directly with the periphery of the outside shell 25. The left member of the shafts 13, being positively driven, imparts motion to the separating-drum through the friction-wheels, two of which are carried, as already noted, by the said driven member of the shafts 13. The two shells 24 and 25 are spaced apart a sufficient distance to afford a chamber B of considerable clearance, which, on account of its function, may be called the "collecting-chamber." The outside shell 25 of the separating-drum is imperforate and is provided on its inner surface with serrated ribs or cleats 30 in spiral arrangement, or so disposed as to cause the loose grain and other material falling into the channels between the same to travel forward toward the head of the machine under the rotary motion of the drum. The inside shell 24 is composed of a series of sections $c$, $c'$, $c^2$, and $c^3$, which are suitably connected together by angle-irons $c^4$ or other equivalent devices. Of the said sections the members $c$, $c'$, and $c^3$ are in form of truncated cones, while the member $c^2$ is of cylindrical form. The conical members $c$ and $c'$ are arranged with their large ends adjoining, and the member $c'$ is cut away or notched on its large margin to afford grain-passages $c^5$ at the joint or lowest point between the said members $c$ and $c'$. This permits the grain collecting from the said conical members $c$ and $c'$ to pass outward through the openings $c^5$ into the collecting-chamber B. The section $c^3$ of the inner shell 24 flares forward and is arranged with its larger end overlapping or breaking joints with the rear margin of the cylindrical section $c^2$, and the member $c^3$ is of larger diameter at that point than the section $c^2$, so as to afford between the two an annular opening or grain-passage $c^6$, which will permit the loose grain from the section $c^3$ to pass outward into the collecting-chamber B. The loose grain on the cylindrical section $c^2$ may pass in either direction, either to the forward conical section $c'$ or the rearward conical section $c^3$, as the case may be.

The outer shell 25 is provided at its forward end with one section 31 of an elevator-trough provided on its interior with flights 32. The said elevator-section 31 is of cylindrical form and open on its inner face and coöperates with a segmental section 33, of trough-like form, at a certain part of the drum's movement to complete the elevator. The segmental trough 33 is fixed to the main frame or casing in any suitable way and is located at the proper point for forming a bottom to the elevator during a part of its upward movement under the rotation of the drum. The segment 33 does not extend downward to the lowest point of the travel of the drum, and hence the elevator-section 31 on the drum is open or free to receive the loose grain from the forward margin of the collecting-chamber B when the drum is at the lowest point of its travel or rotation. The segment 33 is shown as supported at its upper end by a post 34, rising from the casing 7, and as provided with an outlet-spout 35 for delivering the elevated grain over the open space between the cylinder-deck 7 and the rotary drum into a suitable chute (not shown) for directing the same wherever desired.

The inside shell 24 of the separating-drum is provided on its inner surface with a series of teeth or projecting brads $c^7$, rearwardly inclined and set in respect to each other in spiral arrangement, so as to tend to force the straw or stock rearward under the rotary motion of the drum. On the main shaft 2 within the separating-drum is mounted a fan 36 and a conveyer 37. The fan 36 is without any housing, and the blades are of such construction and so set as not only to produce a blast action, but also to operate as a straw whipper or whirler for coöperation with the propeller 37 and the spiral teeth $c^7$ on the inner shell of the drum for propelling the stock. The fan 36 gets its supply of air through the open forward end of the drum at points below the threshing-cylinder. A hood 38 projects rearward from the cylinder-casing, so as to overhang the top of the fan 36. The separating-drum is so related to the main shaft 2 that the latter, together with the fan 36 and the straw-conveyer 37, mounted thereon, is eccentric to the axis of the drum. The forward or open end of the drum is so related to the chamber A as to receive the stock directly therefrom. The rear end of the separating-drum abuts against and forms a sufficiently-close joint with a cross-partition 39, fixed to the main frame and provided with an opening or passage 40, which constitutes the outlet from the drum. Directly rearward of the partition 39 is located a discharger, comprising a pair of fans 41 and 42, mounted on the main shaft 2 within a housing 43, divided into two compartments by a partition 44. The eye of the fan 41 is coincident or in line with the opening 40 through the partition 39. The eye of the fan 42 opens into an outside chamber 45, extending rearward of the housing 43 and under the same, as best shown in Fig. 3. The forward end of the chamber 45 is open, so as to receive from the rear end of the chamber B between the two shells of the separating-drum. Both fans of the discharger deliver through a common outlet or stacker tube 46. In virtue of the arrangement of the fans 41 and 42 to their respective housings and to the chamber 45 the member 41 will operate as a suction-fan drawing from the interior of the inner shell 24 of the separating-drum, while the member 42 will operate as a suction-fan drawing from the chamber B between the two shells 24 and 25 of said drum.

It has already been noted that the main shaft 2 is eccentric to the axis of the separating-drum and that the passage 40 in the partition 39 is in line with the eye of the discharger-fan 41 on the shaft 2. It follows that the outlet from the separating-drum is eccentric to the axis of the same. From the location of the receiver A in respect to the threshing-cylinder it is equally obvious that the inlet from said receiver A to the separating-drum is also eccentric to the axis of the drum and on the opposite side of the same from the outlet to the discharger. These relations are important in respect to the functions of the mechanism, as will presently more fully appear.

The fan 36, conveyer 37, and the discharger-fans 41 and 42 turn, of course, at the same rate of speed as the threshing-cylinder, as they are all on the common shaft 2. The separating-drum, receiving its motion through the friction-wheels and the shaft 13, connecting with the shaft 2 through the pulleys $15^a$ and $15^b$ and a suitable belt, (not shown,) turns at a comparatively low rate of speed in a direction opposite to the parts carried by the shaft 2. The blast-fan 16 and the worm conveyer 23 in the receiving-chamber A turn in the same direction as the cylinder and preferably at a little higher speed than the cylinder.

Having regard to the operation, the action of the several parts has been more or less fully stated in connection with the detailed description, but the general operation of the machine as an entirety may be briefly summarized as follows: The unthreshed grain is fed to the cylinder and concave through the hopper 6 in the usual or any suitable way. The threshed stock is delivered from the cylinder and concave into the chamber A, and under the action of the blast-fan 16 and the worm conveyer 23 the straw is given a centrifugal motion and at the same time is rapidly moved rearward and delivered to the separating-drum. On reaching the separating-drum the straw becomes subject to the fan 36, the conveyer 37, and the teeth $c^7$ on the inside shell of the drum. Under the cooperation of these parts the centrifugal motion of the straw is kept up at a high rate of speed and at the same time, owing to the eccentric location of the parts 37 and 36 relative to the axis of the drum and the eccentric positions of the inlet and the outlet openings to and from the drum and on opposite sides of the axis of the same, it follows that the straw will be given a violent pitch into the upper angle or corner of the separating-drum, at the lower end of the same, before passing to the discharger. This upper angle or corner of the separating-drum, at the rear end of the same, is, in virtue of the relations just above noted, outside or eccentric to the main line of the air blast or draft and therefore constitutes a comparatively dead-air pocket or chamber through which the straw is made to pass on its way to the discharger. As the straw is thus thrown into the dead-air pocket at a point above the line of draft from the outlet 40 to the discharger it gives a settling-point for the efficient action of gravity on the loose grain just before the threshed straw is drawn into the discharger. Most of the grain is of course knocked out from the straw at the threshing-cylinder and concave, and collecting on the gather-board 8 is directed to the lowest part of the chamber A. Under the centrifugal motion on the straw within chamber A much additional grain will be separated from the straw and fall to the floor of the said chamber and be directed, together with the part received from the gather-board 8, to the section c of the separating-drum. Under the centrifugal motion and the beating motion in the separating-drum before reaching the dead-air pocket most of the remaining grain will be shaken out from the straw, and, finally, on the passage of the straw through the dead-air space or pocket at the upper rear angle of the separating-drum all the remaining grain of value will be precipitated and caught by the drum. All the loose grain caught by the drum passes out through the openings $c^5$ and $c^6$ in the inner shell to the collecting-chamber B between the two shells of the drum. More or less of the broken heads, chaff, and other coarse broken materials will also drop through the inner shell into the chamber B. The strong draft available from the discharger-fan 42 through the chamber B will be effective to draw all the chaff, loose straws, and other like material rearward into the chamber 45 and into the rear eye of the discharger, while the grain will be caught in the channels between the serrated ribs 30 and under the motion on the drum will be worked forward and delivered to the elevator 31. The serrated ribs 30 not only serve to form this conveying-channel for the collected grain, but also serve to hold up the loose and broken heads and other light material away from the floor of the outside shell, while affording good air-passages between the points of the teeth of said ribs, whereby the suction or air-current produced by the fan 42 of the discharger is rendered much more effective in drawing the same rearward to the discharger.

From the foregoing statements it must be obvious that the mechanism herein described is very effective for threshing and separating grain. I believe that by my improvements, herein disclosed, substantially complete and perfect separation can be effected of the pure grain from the straw and other material, while at the same time permitting the use of the pneumatic stacker for directing the threshed straw and chaff to the stack. Those familiar with the use of the ordinary pneumatic stacker in connection with the ordinary threshing-machine and separator, or any others hitherto used, so far as I am aware, know that a part of the good grain is carried off through the stacker. My mechanism will save that loss.

It will be understood, of course, that many changes might be made in the details of the construction without departing from the spirit of my invention.

In regard to the action, it should also have been noted that the fact of the main shaft 2 and the parts 36 and 37 carried thereby within the drum turning opposite to the direction of the drum's rotation is an important feature for increasing the efficiency of the separating action. In virtue of this fact the straw within the drum will be torn apart and broken up much more effectively than if all the said parts turned in the same direction under the coöperation of the teeth $c^7$ on the inner shell of the drum and the fan 36 and conveyer 37 on the main shaft 2.

What I claim, and desire to secure by Letters Patent of the United States, is as follows:

1. The combination with a thresher and a rotary separating-drum, of a trunk or casing section between the two, and a fan and worm conveyer in said casing-section for coöperation therewith to receive the stock from the thresher, subject the same to centrifugal action and deliver the same to said drum, substantially as described.

2. The combination with a thresher, of a centrifugal separator involving a straw-discharger, a separating drum or shell, receiving from said thresher and delivering to said straw-discharger, at points out of line with each other and eccentric to the axis of said drum, means for subjecting the stock to the action of centrifugal force, within said drum, and means for producing a forced current of air through said drum, whereby the stock is subjected to centrifugal action and forced currents of air and will be thrown through a comparatively dead-air space on its passage through said drum to the discharger, substantially as described.

3. The combination with a thresher, of a centrifugal separator comprising a straw-discharger, a rotary separating-drum receiving from the thresher and delivering to the discharger, at points eccentric to the axis of said drum, and a combined fan and conveyer within said drum and eccentric to its axis, for coöperation, whereby the stock is subjected to centrifugal action and forced currents of air and will be thrown through a comparatively dead-air space on its passage through the drum to the discharger, substantially as described.

4. The combination with a thresher, of a straw-discharger, a rotary separating-drum receiving from the former and delivering to the latter, at points eccentric to the drum's axis, a blast-fan delivering to the head of said drum, a combined fan and conveyer within said drum and eccentric to the axis thereof, and spirally-arranged teeth on the inner surface of said drum, all for coöperation substantially as described.

5. A centrifugal separator comprising a rotary separating-drum made up of concentric shells spaced apart from each other, the inner member of which is provided with grain-passages, and a combined fan and rotary agitator independently mounted within said drum, for setting up a whirling motion of the stock and subjecting the same to forced currents of air, substantially as described.

6. The combination with a thresher, of a rotary separating-drum composed of concentric shells spaced apart from each other, the inner member of which is provided with grain-passages to the space or collecting chamber between the two, and a two-fan discharger, one of which fans draws from the inner shell and the other of which draws from said collecting-chamber between the two shells, substantially as described.

7. The combination with a thresher, of a separating-drum made up of concentric shells spaced apart to form a collecting-chamber between the two and the inner member provided with grain-passages, serrated ribs or cleats on the inner surface of the outer shell, in spiral arrangement, and the two fan-dischargers one of which fans draws from the inner shell and the other from said collecting-chamber, substantially as described.

8. The rotary separating-drum made up of concentric shells, the outer member of which is imperforate and the inner member of which is composed of a series of sections, some of which are in the form of truncated cones, with grain-passages between said sections, in combination with a rotary agitator mounted inside the inner shell for setting up a whirling motion of the stock, and fans for applying forced currents of air both to the interior of the inner shell and to the collecting-chamber between the two shells, substantially as described.

9. The combined thresher and separator, comprising a horizontal threshing-cylinder and concave delivering sidewise of the main frame, the chamber A receiving from said cylinder and concave and equipped with the blast-fan 17 and the conveyer 23, the rotary separating-drum composed of the concentric shells 24 and 25 constructed and arranged as described, to afford the collecting-chamber B between said shells, the two-fan straw-discharger mounted on the same shaft as the cylinder, rearward of the drum, with one fan drawing from the interior of the drum and the other from said collecting-chamber between the two shells, the casing-partition 39 with passage 40, the fan 36 and the conveyer 37 within the drum on the same shaft as the cylinder and the discharger and turning opposite to the motion of the drum, and the teeth $c^7$ on the inside surface of the inner shell of the drum, all arranged and coöperating substantially as and for the purposes set forth.

In testimony whereof I affix my signature in presence of two witnesses.

FRANK E. McNALL.

Witnesses.
C. F. KILGORE,
JAS. F. WILLIAMSON.